(12) United States Patent
Jutte et al.

(10) Patent No.: US 6,650,613 B2
(45) Date of Patent: Nov. 18, 2003

(54) OPTICAL SCANNING DEVICE

(75) Inventors: Petrus Theodorus Jutte, Eindhoven (NL); Peter Coops, Eindhoven (NL); Joris Jan Vrehen, Eindhoven (NL)

(73) Assignee: Koninklijke Philips Electronics N.V., Eindhoven (NL)

( * ) Notice: Subject to any disclaimer, the term of this patent is extended or adjusted under 35 U.S.C. 154(b) by 39 days.

(21) Appl. No.: 10/122,465

(22) Filed: Apr. 15, 2002

(65) Prior Publication Data

US 2003/0039197 A1 Feb. 27, 2003

(30) Foreign Application Priority Data

Apr. 17, 2001 (EP) .............................. 01201392

(51) Int. Cl.[7] ................................. G11B 7/00
(52) U.S. Cl. ................. 369/112.17; 369/53.26
(58) Field of Search ................. 369/53.26, 112.16, 369/112.17, 112.22, 112.28, 112.29, 116, 121, 124.03

(56) References Cited

U.S. PATENT DOCUMENTS

| | | | | |
|---|---|---|---|---|
| 4,965,780 A | * | 10/1990 | Lee et al. ................. | 369/13.3 |
| 5,467,336 A | * | 11/1995 | Ando et al. .............. | 369/13.29 |
| 5,661,711 A | * | 8/1997 | Tanaka et al. ............ | 369/53.2 |
| 6,067,283 A | * | 5/2000 | Muramatsu .............. | 369/112.1 |
| 6,240,053 B1 | * | 5/2001 | Akiyama ................. | 369/44.23 |
| 6,275,461 B1 | * | 8/2001 | Yoo et al. ............... | 369/112.01 |
| 6,304,542 B1 | * | 10/2001 | Dang et al. ............. | 369/112.23 |
| 6,370,103 B1 | * | 4/2002 | Yamazaki et al. ...... | 369/112.26 |

FOREIGN PATENT DOCUMENTS

EP            1001414 A2    5/2000

* cited by examiner

Primary Examiner—Paul W. Huber
(74) Attorney, Agent, or Firm—Michael E. Belk

(57) ABSTRACT

An optical scanning device for scanning a recordable optical disk (20) with a laser beam having a linear polarisation. A quarter wave plate (16) is used to alter the polarisation of the beam on reflection from the disk. A partially polarising beam splitter (8) is used and arranged such that a proportion of intensity of the incident beam passed is greater than a proportion of intensity of the reflected beam. A relatively high optical signal power at the disk (20) can be achieved for recording purposes whilst allowing the beam splitter (8) to be manufactured in a relatively efficient manner.

16 Claims, 3 Drawing Sheets

OPTICAL SCANNING DEVICE

This invention relates to an optical scanning device for scanning an optical record carrier, such as an optical disk, including at least one information layer. The device includes one or more radiation sources for generating one or more radiation beams of one or more different wavelengths. In particular, but not exclusively, the invention relates to a device in which a radiation source is used during an optical record carrier write process which requires higher beam power at the spot on which the beam is focussed on the optical record carrier than an optical record carrier read process.

In the case of a disk format such as CD-R (Compact Disk—Recordable), the disks exhibit relatively high reflectance. For these, and other, formats, to increase the speed of writing data to a disk tends to require an increase in optical power level for recording purposes. At the same time, there is a desire to achieve a low-cost solution allowing the efficient manufacture of the device and its components in high volumes. When manufacturing components in high volumes, a key factor is the stability and reproducibility of the manufacturing process. If a process is unstable or difficult to reproduce, it has a significant effect on the final cost.

EP-A-1001414 describes an optical pickup capable of recording or reproducing information on or from compact disk formats, as well as reading from DVD disk formats. A single main optical path is used for both of the different wavelength beams, and respective beam splitters are used to couple the radiation beams into the main optical path. A monitoring device capable of detecting the output of light emitted from the fist and second optical sources is placed behind one of the beam splitters, outside the main optical path.

In accordance with the present invention there is provided an optical scanning device for scanning an optical record carrier, said device comprising a radiation source for emitting an incident radiation beam comprising a predetermined wavelength at a substantially linear polarisation, a reflective element located in the path of the incident radiation beam from the radiation source to the location of said optical record carrier and arranged to pass a first proportion, of the incident beam intensity which is incident upon the reflective element, towards the optical record carrier, a polarisation-altering element located in the path of the radiation beam from the reflective element to the location of said optical record carrier, and a detector for detecting a radiation beam reflected from said optical record carrier and passing along a path including the polarisation-altering element and the reflective element, the reflective element being arranged to pass a second proportion, of the reflected beam intensity incident upon the reflective element, towards the detector, the polarisation-altering element converting a linear polarisation of said incident beam into a substantially circular polarisation such that the incident and reflected beam have a different polarisation before and after passing through said polarisation-altering element respectively, characterised in that said reflective element is a partially polarising reflective element arranged such that said first proportion of intensity is greater, as a proportion, than said second proportion of intensity.

By use of a partially polarising reflective element in which the proportion of intensity passed for the polarisation of the incident beam is greater than the proportion of intensity passed for the polarisation of the beam reflected by the record carrier, a relatively high optical signal power at the optical record carrier can be achieved for recording purposes whilst allowing the reflective element to be manufactured in a relatively efficient manner. For the sake of clarity, the term "proportion" is intended to be understood as a fraction, namely the "proportion of intensity passed" is the intensity of the beam following the component divided by the incident of the beam before reaching the component, each intensity being taken at the centre of the beam. Using the invention, a relatively high level of transmission of the reflected beam towards the detector is also achievable, such that a desired data readout performance is achieved. A specified angular tolerance exhibited by the reflective element can also be achieved in a similar manner. Furthermore, the invention provides a reduced sensitivity to birefringence of the disk, which can in some known arrangements significantly reduce signal levels.

In one embodiment of the invention the device further comprises a sensor for sensing radiation from the incident beam transmitted through said reflective element during an optical record carrier write process, allowing the intensity at, or close to, the centre of the incident beam emitted by the radiation source to be monitored. Alternatively, the intensity of the incident beam may be monitored at the edge of the beam for example prior to its incidence on the reflective element. However, this is not preferred due to a significantly larger spread in signal levels.

The device may further comprise a second radiation source for emitting a second radiation beam comprising a different predetermined wavelength, and a second reflective element for reflecting said second radiation beam towards the location of said optical record carrier.

This arrangement further allows the invention to be implemented in a dual-wavelength light path device. In such a device, improved performance could be achieved using a perfect (or practically near-perfect) double polarising coating operating at the two different wavelengths. However, such a double polarising coating is very difficult to produce, unless intended use with parallel beams, in which case the optical pickup becomes more complex, bulky and expensive. By use of the present invention such problems may be mitigated. Thus, the first and/or second wavelength beams are preferably non-parallel when passing through the reflective element.

Further features and advantages of the present invention will become apparent from the following description of preferred embodiments of the invention.

It is noted that beam splitters having partially polarising reflection characteristics are known in the field of magneto-optic scanning devices. Such a device is described in U.S. Pat. No. 5,467,336. However, such arrangements are use for a different purpose and do not include a polarisation-altering element, such as the quarter wave plate used in embodiments of the present invention, whereby the polarisation of incident light is altered on reflection from the optical record carrier.

Embodiments of the invention will now be described, by way of example only, with reference to the following drawings, wherein.

Figure 1:
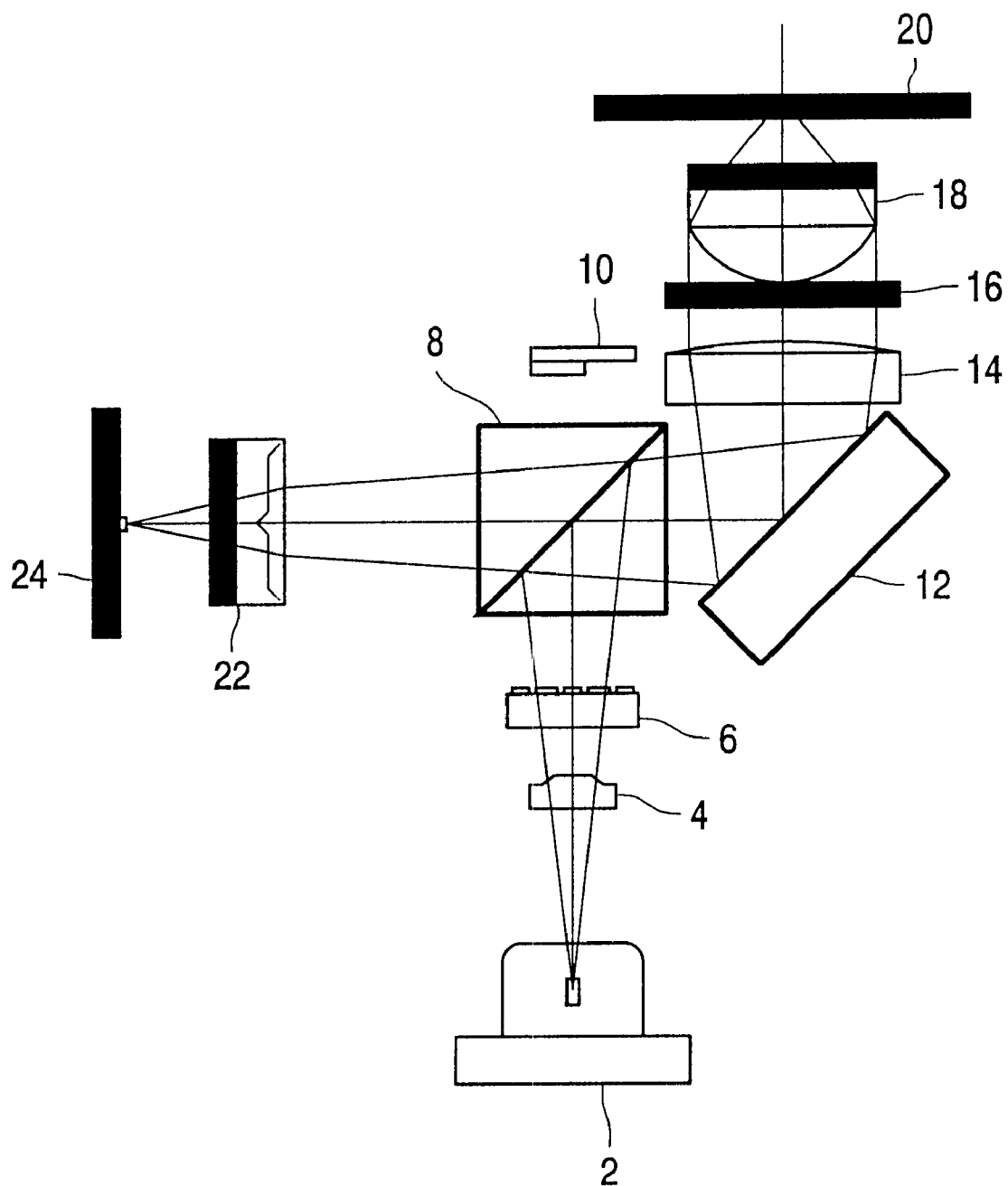
FIG. 1 is a schematic illustration of an optical scanning device in accordance with a first embodiment of the invention.

In accordance with embodiments of the invention, a recordable optical disk, such as a CD-R (Compact Disk—Recordable) or CD-RW (Compact Disk—Rewritable) is used for storing data, which may be written and read-out by means of the optical scanning device. The disk includes an outer transparent layer covering at least one information layer. In the case of a multilayer optical disk, two or more information layers are arranged behind the cover layer, at different depths within the disk. The side of the information layer, or in the case of a multilayer disk the side of the layer furthest away from the cover layer, facing away from the transparent layer is protected from environmental influences by a protection layer. The side of the transparent layer facing the device is the disk entrance face.

Information may be stored in the information layer or layers of the optical disk in the form of optically detectable marks arranged in substantially parallel, concentric or spiral tracks. The marks may be in any optically readable form, for example in the form of pits or areas with a reflection coefficient different from their surroundings. The information layer or layers are formed of an optically recordable material, for example a radiation-sensitive dye as used in the CD-R format, which requires a relatively high power for rewriting the disk, compared to that required for data read-out.

The optical scanning device includes a polarised radiation source 2, for example a semiconductor laser, operating at a predetermined wavelength, for example the CD wavelength $\lambda$=790 nm, and with a linear polarisation. The source 2 emits a diverging radiation beam. The light path includes a pre-collimator lens 4 and a grating element 6 prior to the beam reaching a cubic beam splitter 8, which lies in the optical path between the optical disk 20 and the detector 24. The beam splitter 8 is a partially polarising beam splitter, as will be discussed in further detail below. As the beam remains divergent as the beam impinges on the reflecting surface of the beam splitter, the beam splitter preferably has good tolerance for angular variation from the axial. Although in this embodiment a cubic beam splitter 8 is used, a plate beam splitter may be used in the alternative.

Behind the beam splitter 8, and arranged generally centrally of the beam projected onto the beam splitter 8 from the radiation source 2, lies a forward-sensing diode 10. This is arranged to detect light from the central, high intensity region of the beam which is transmitted through the beam splitter. The diode 10 is used to monitor and control the power of the radiation source 2, both during data read-out from the disk 20 and during the process of writing data to the disk 20, when a relatively high power level is used for the radiation source.

The radiation which is reflected by beam splitter 8 is further reflected by folding mirror 12 towards the disk 20. Before it reaches the disk, the beam passes through a collimator lens 14, which converts the divergent beam to a generally parallel beam, a quarter wavelength plate 16 which converts the linear polarisation of the beam into a circular polarisation, and an objective lens 18 for focusing the beam onto a spot on an information layer in the disk 20. On reflection from the disk, the handedness of the circular polarisation is reversed, and on passing through the quarter wavelength plate 16 the polarisation of the beam is altered into a linear polarisation which is orthogonal to the original linear polarisation of the beam. After folding, the beam is transmitted, at least in part, through beam splitter 8 and, via a servo focusing lens 22, onto the photodetector 24, which converts the optical signal into an electric signal for data read-out, and signals for focus control and tracking error control, as is known in the art. In an alternative embodiment, the precollimator 4 is omitted and a collimator lens 14 with a higher numerical aperture is used. The collimator lens 18 and/or the quarter wavelength plate 16 may also alternatively be placed in front of the folding mirror 12.

In this embodiment of the invention, the beam splitter 8 is a partially-polarising beam splitter. Herein, the terms reflectivity (R) and transmitivity (T) are used to describe the percentage of a radiation intensity which is reflected, and transmitted by a reflective element, respectively. The term "partially polarising" means that the reflectivity of the element for one linear polarisation (for example an "S" polarisation, which in this example is the polarisation of the incident radiation beam between the source and the quarter-wave plate) is significantly unequal to, differing for example by at least 10% from, the reflectivity of the element for the orthogonal polarisation (for example a "P" polarisation, which in this example is the polarisation of the reflected radiation beam between the quarter-wave plate and the detector), whilst the perfectly polarising case (100%, or practically 100%, reflectivity for one polarisation and 100%, or practically 100%, transmitivity for the other) is not achieved.

In this embodiment, the reflectivity of the beam splitter for the incident radiation beam (Rs) is selected at between 75% and 100%. By ensuring that the reflectivity is above 75%, the writing power of the incident radiation beam is maintained at a high level. However, above 97% a forward sensing signal becomes so low, that including coating manufacturing tolerances the spread in signal levels becomes too large. More preferably, the range is selected between 85% and 95%, thus allowing a relatively low-cost diode, used as the forward-sensing diode 10, to provide accurate and high bandwidth power correction signals during a write procedure. In contrast, if beam edge detection, in which a sensor is placed in the periphery of the incident beam prior to the beam splitter, were used (allowing a higher Rs, say Rs>95%), tolerances on the forward sensing signal become very large. On the other hand, in this embodiment, the transmitivity of the beam splitter for the reflected radiation beam (Tp) is selected to be significantly less than the above-mentioned reflectivity, namely at between 15% and 75%, more preferably at between 25% and 62%. Although this relatively low transmitivity reduces the power at the detector, compared to a beam splitter exhibiting a higher Tp, power at the detector is not so critical during data read-out, whilst the producability of the beam splitter can thereby be significantly improved. Furthermore, by selecting such values for Tp, the angular tolerance of the beam splitter can more readily be maintained at good levels. Limitation of the power used during a write process, in order to remain within the working range of the detector 24 during writing, can also be avoided.

One example of the partially polarising characteristics of a multi-layer thin-film coating in accordance with this first embodiment is as follows, with the device operating at the CD wavelength ($\lambda_1$=790 nm).

TABLE 1

| $\lambda$ | Tp | Rp | Ts | Rs |
|---|---|---|---|---|
| $\lambda_1$ (790 nm) | 50% | 50% | 10% | 90% |

A beam splitter reflective interface according to the above example, with characteristics matching or close to those given, is readily implementable by persons skilled in the art, by the selection of an appropriate thin layer scheme.

Figure 2:
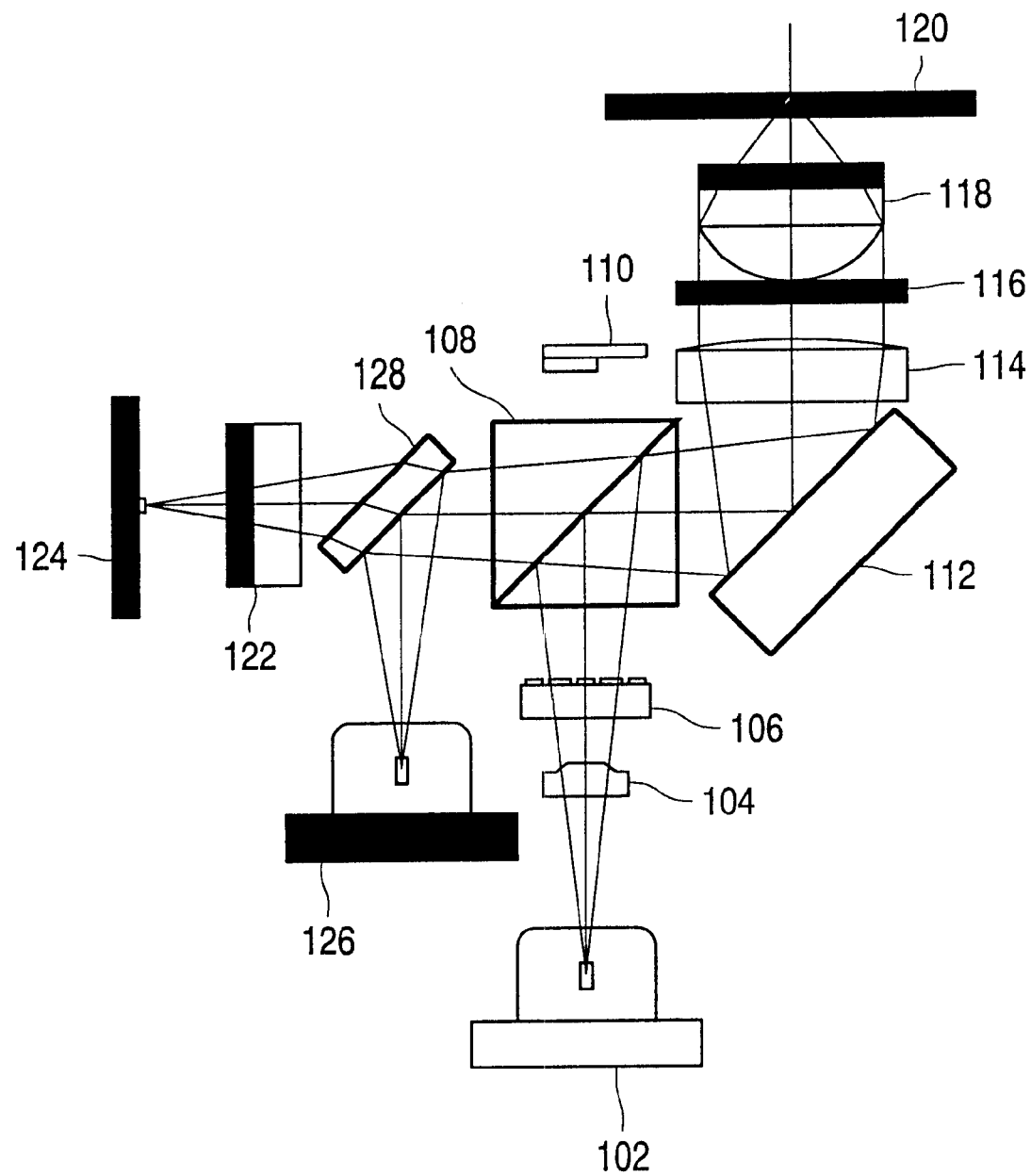
FIG. 2 is a schematic illustration of an optical scanning device in accordance with a second embodiment of the invention.

FIG. 2 illustrates a second embodiment of the invention, a dual-wavelength optical scanning device. For avoidance of repetition, in FIG. 2, elements of the arrangement having the same function as described in relation to elements of the arrangement of FIG. 1 carry the same reference numerals, incremented by 100. The arrangement further includes a second polarised radiation source 126, for example a semiconductor laser, operating at a predetermined wavelength, for example a DVD wavelength ($\lambda_2$=655 nm), and with a linear polarisation which is arranged orthogonally relative to that of the first radiation source 102 (for this example we assume a "P" polarisation state). A second beam splitter 128, in the form of a plate, is used to couple the incident radiation from the second radiation source 126 into the main optical path between the location of the optical disk 120 and the detector 124. In this case, formats of optical disk operating at different wavelengths may be selectively scanned, for example the optical disk may be any of the CD (including CD-R and CD-RW) and the DVD formats. Due to the differing characteristics of CD and DVD read-out, the components in the main optical path are corrected for DVD read-out.

In this embodiment, a relatively high power write performance is achieved with the beam produced by the first radiation source 102, for the writing of CD-Rs and CD-RWs. On the other hand, radiation source 126 is used for data read-out only.

In this embodiment, quarter wave plate 116 operates at the first wavelength, that of radiation source 102, only. The effect of the quarter wave plate at the second wavelength is not critical when, as preferred, the scanning device is arranged such that Ts and Tp are approximately equal in the path between the disk and the detector. For ease of manufacture, the quarter wave plate may not have quarter wave functionality at the second wavelength. Since furthermore the first radiation beam only passes through the second beam splitter in its reflected state, there is no need for the second beam splitter 18 to be polarising, and for ease of manufacture is therefore preferably non-polarising.

For the second radiation beam, the second beam splitter is optimised on the one hand to reflect as much of the incident beam as possible, to couple the beam into the main optical path, and on the other hand to transmit as much as possible of the reflected beam. Since Tp+Rp=100% (assuming no absorbance), an optimised power at the detector will be achieved if Tp and Rp are selected, for the second wavelength, to be in the region of 50%. Furthermore, since the reflectivity characteristics of the beam splitter can be varied in dependence on the wavelength, an ideal setting for the transmitivity of the first beam splitter 108 is 100%; therefore a practical value close to 100% (say 90% or more) is arranged for the first beam splitter when operating at the second wavelength.

For the first radiation beam, the characteristics described above for the first embodiment in relation to the first beam splitter also apply here, along with the ensuing advantages described, including ease of manufacture, which is otherwise decreased since the beam splitter must operate with selected characteristics at two different wavelengths. For the first radiation beam, an ideal setting for the transmitivity of the second beam splitter 128 is 100%; therefore a practical value close to 100% (say 90% or more) is arranged for the second beam splitter when operating at the first wavelength.

In the present embodiment both radiation beams are detected by the same photodetector 124 along the same light path, which reduces complexity, both in the optical detection arrangement and in the electronic signal processing circuitry in the optical scanning device. Furthermore, the reflection characteristics of the two beam splitters may be selected such that the optical power at the detector in the case of scanning with either of the two wavelength beams falls within a similar range, at least within the dynamic range of the detector, which is generally spans a range from it's lowest value to a highest value three times that, or higher in the case of particular detector types. Preferably, the reflection characteristics are chosen such that the transmitivity of the optical system between the disk and the detector is substantially equal in both cases.

One example of the (ideal) partially polarising characteristics of a multi-layer thin-film coating for each of the first and second beam splitters in accordance with this second embodiment is as given in tables 2a and 2b below.

TABLE 2a

| | Beam splitter 1 | | | |
|---|---|---|---|---|
| $\lambda$ | Tp | Rp | Ts | Rs |
| $\lambda_1$ (790 nm) | 50% | 50% | 10% | 90% |
| $\lambda_2$ (655 nm) | 100% | 0% | 100% | 0% |

TABLE 2b

| | Beam splitter 2 | | | |
|---|---|---|---|---|
| $\lambda$ | Tp | Rp | Ts | Rs |
| $\lambda_1$ (790 nm) | 100% | 0% | 100% | 0% |
| $\lambda_2$ (655 nm) | 50% | 50% | 50% | 50% |

In this embodiment, Rs=90% for beam splitter 1 at the first wavelength, to enable the use of a forward sense diode sensor 110. However, in an alternative beam edge detection is used, allowing this Rs value to be increased towards 100% to enable maximum recording power.

Note that, in the above example, the reflection characteristics of the two beam splitters are such that the transmitivity of the optical system between the disk and the detector is equal in both cases. Namely, for the first wavelength, the transmitivity is Tp($\lambda_1$, beamsplitter1)×Tp($\lambda_1$, beamsplitter2)=50%×100%=50%, and for the second wavelength, the transmitivity is Tp($\lambda_2$, beamsplitter1)×Tp($\lambda_2$, beamsplitter2)=100%×50%=50%.

In the above, ideal values have been given. In practice, values in the proximity of the ideal values are preferably used. An example of values achievable in practice, including practical tolerances on the laser wavelengths, with the actual beam splitter characteristics varying in dependence on the thin layer scheme used, are given in tables 3a and 3b below.

TABLE 3a

| | Beam splitter 1 | | | | |
|---|---|---|---|---|---|
| $\lambda$ | Tp | Rp | Ts | Rs | Angle of Incidence |
| $\lambda_1$ (790 ± 10 nm) | 50 + 12/−5% | 50 + 5/−12% | 10 ± 5% | 90 ± 5% | ±5° |
| $\lambda_2$ (655 + 10/ −5 nm) | >95% | <5% | >95% | <5% | ±6 |

TABLE 3b

Beam splitter 2

| λ | Tp | Rp | Ts | Rs | Angle Incidence |
|---|----|----|----|----|-----------------|
| $\lambda_1$ (790 ± 10 nm) | >95% | <5% | >95% | <5% | ±5° |
| $\lambda_2$ (655 + 10/−5 nm) | 50 ± 5% | 50 ± 5% | 40 ± 10% | 60 ± 10% | ±6° |

A beam splitter reflective interface according to the above example, with characteristics matching or close to those given, is readily implementable by persons skilled in the art, by the selection of an appropriate thin layer scheme.

Figure 3:
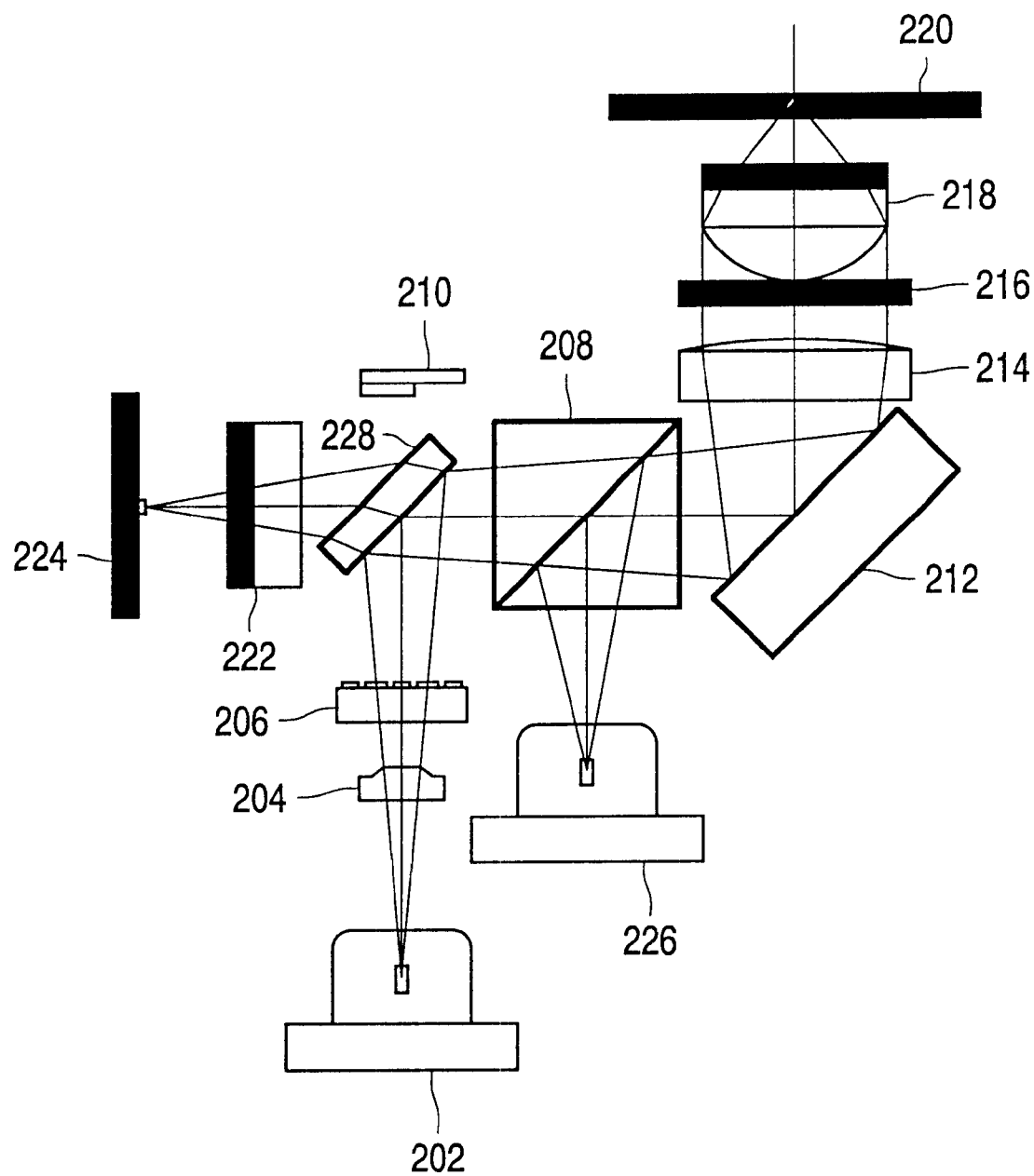
FIG. 3 is a schematic illustration of an optical scanning device in accordance with a third embodiment of the invention.

FIG. 3 illustrates a third embodiment of the invention. Again, to avoid unnecessary repetition, the components present in this embodiment which correspond to those described in relation to the second embodiment bear the same reference numerals, incremented by 100. In this alternative embodiment, the beam splitter 228 used to couple radiation from the first wavelength radiation source 202 into the main optical path is placed further from the optical record carrier 224 than the beam splitter 208 used to couple radiation from the second wavelength radiation source 226 into the main optical path.

In the second and third embodiments described above, a plate-type beam splitter may replace the cubic beam splitter. In this alternative, the light path of the second wavelength radiation beam is made parallel through the beam splitter by use of a further collimator lens placed before the beam splitter. The collimator for the first wavelength light is then placed before its respective beam splitter.

Although in the above embodiments the incident beam is passed by reflection through the first beam splitter and the reflected beam is passed by transmission thought the first beam splitter, in alternative embodiments the beams are passed by transmission through the first beam splitter towards the disc and in reflection towards the detector. In the case of the second and third embodiments, using two wavelengths, the second wavelength incident beam is also passed in reflection by the first beam splitter.

In further alternative embodiments, similar to the second and third embodiments described above, the arrangement is used in a dual writer scanning device. That is to say, the first wavelength is used for the writing of certain optical disks (e.g. CD-R and CD-RW), whilst the second wavelength is used for the writing of other optical disks (e.g. DVD+R and DVD+RW and other recordable disk formats such as DVD-R, DVD-RW and DVD-RAM). In this embodiment, a second forward sensing diode is used opposite the source emitting the second wavelength radiation. Furthermore, the quarter wavelength plate is in this embodiment preferably designed to provide quarter wavelength functionality at both the first and second wavelengths.

The above embodiments are to be understood as illustrative examples of the invention. Further embodiments of the invention are envisaged. It is to be understood that any feature described in relation to one embodiment may also be used in other of the embodiments. Furthermore, equivalents and modifications not described above may also be employed without departing from the scope of the invention, which is defined in the accompanying claims.

What is claimed is:

1. An optical scanning device for scanning an optical record carrier, said device comprising a radiation source for emitting an incident radiation beam comprising a predetermined wavelength at a substantially linear polarisation, a reflective element located in the path of the incident radiation beam from the radiation source to the location of said optical record carrier and arranged to pass a first proportion, of the incident beam intensity which is incident upon the reflective element, towards the optical record carrier, a polarisation-altering element located in the path of the radiation beam from the reflective element to the location of said optical record carrier, and a detector for detecting a radiation beam reflected from said optical record carrier and passing along a path including the polarisation-altering element and the reflective element, the reflective element being arranged to pass a second proportion, of the reflected beam intensity incident upon the reflective element, towards the detector, the polarisation-altering element converting a linear polarisation of said incident beam into a substantially circular polarisation such that the incident and reflected beam have a different polarisation before and after passing through said polarisation-altering element respectively, characterised in that said reflective element is a partially polarising reflective element arranged such that said first proportion of intensity is greater, as a proportion, than said second proportion of intensity.

2. An optical scanning device according to claim 1, wherein said reflective element is arranged to reflect the incident beam and to transmit the reflected beam, the reflectivity of the reflective element for the polarisation of the incident beam being greater than the transmitivity of the reflective element for the polarisation of the reflected beam.

3. An optical scanning device according to claim 1, wherein said reflective element is arranged to transmit the incident beam and to reflect the reflected beam, the transmitivity of the reflective element for the polarisation of the incident beam being greater than the reflectivity of the reflective element for the polarisation of the reflected beam.

4. An optical scanning device according to claim 1, wherein said first proportion is greater than 75%.

5. An optical scanning device according to claim 1, wherein said first proportion is less than 97%.

6. An optical scanning device according to claim 4, wherein said first proportion is between 85% and 95%.

7. An optical scanning device according to claim 1, further comprising a sensor for sensing radiation from the approximate centre of the incident beam, which radiation is transmitted through or reflected by said reflective element, and not passing towards the optical record carrier, for controlling an output characteristic of said radiation source.

8. An optical scanning device according to claim 1, wherein said second proportion is within the range 15% to 75%.

9. An optical scanning device according to claim 1, wherein said second proportion is within the range 25% to 62%.

10. An optical scanning device according to claim 1, further comprising a second radiation source for emitting a second radiation beam comprising a different predetermined wavelength, and a second reflective element for reflecting or transmitting said second radiation beam towards said optical record carrier.

11. An optical scanning device according to claim 10, wherein said first reflective element is arranged to have a substantially non-polarising effect on radiation of said second wavelength.

12. An optical scanning device according to claim 10, wherein said second reflective element is arranged to have a substantially non-polarising effect on radiation of said first and/or said second wavelength.

13. An optical scanning device according to claim 11, wherein said second reflective element is arranged to have an approximately 50% transmitivity for radiation of said second wavelength.

14. An optical scanning device according to claim 12, wherein said second reflective element is arranged to have a substantially 100% transmitivity or reflectivity for radiation of said first wavelength.

15. An optical scanning device according to claim 13, further comprising a signal detector for data read-out from optical record carriers, elements of said detector being used for both said first and said second wavelength radiation.

16. An optical scanning device according to claim 1, wherein said first radiation source is arranged for use during an optical record carrier write process which requires higher power at the optical record carrier than an optical record carrier read process.

* * * * *